(12) United States Patent
Audebaud (10) Patent No.: US 10,665,136 B2
(45) Date of Patent: May 26, 2020

(54) PEDESTRIAN ORIENTATION STRUCTURE

(71) Applicant: VOOG, Lyons (FR)

(72) Inventor: Matthieu Audebaud, Lyons (FR)

(73) Assignee: VOOG, Lyons (FR)

( * ) Notice: Subject to any disclaimer, the term of this patent is extended or adjusted under 35 U.S.C. 154(b) by 0 days.

(21) Appl. No.: 16/089,423

(22) PCT Filed: Mar. 10, 2017

(86) PCT No.: PCT/FR2017/050550
§ 371 (c)(1),
(2) Date: Sep. 28, 2018

(87) PCT Pub. No.: WO2017/168070
PCT Pub. Date: Oct. 5, 2017

(65) Prior Publication Data
US 2019/0279533 A1 Sep. 12, 2019

(30) Foreign Application Priority Data
Apr. 1, 2016 (FR) ...................................... 16 52854

(51) Int. Cl.
*G09B 29/10* (2006.01)
*E01F 9/688* (2016.01)
*G09F 15/00* (2006.01)

(52) U.S. Cl.
CPC .............. *G09B 29/10* (2013.01); *E01F 9/688* (2016.02); *G09F 15/005* (2013.01)

(58) Field of Classification Search
CPC ..... G09F 2007/1878; G09F 2013/0459; G09F 2013/0472; G09F 15/005

USPC ....................... 40/606.14, 484, 435
See application file for complete search history.

(56) References Cited

U.S. PATENT DOCUMENTS

| | | | | |
|---|---|---|---|---|
| 1,437,193 A | * | 11/1922 | Phillippi | G09B 1/22 434/416 |
| 1,541,979 A | * | 6/1925 | Lowther | G08G 1/096716 116/63 R |
| 1,717,718 A | * | 6/1929 | Marshall | G09F 3/202 40/495 |

(Continued)

FOREIGN PATENT DOCUMENTS

| | | |
|---|---|---|
| BE | 904 513 | 9/1986 |
| FR | 2 760 863 | 9/1998 |

(Continued)

*Primary Examiner* — Kristina N Junge
(74) *Attorney, Agent, or Firm* — Clark & Brody LP (57) ABSTRACT

A directional guidance system (1) includes a base (2) configured to be mounted on a surface; and an information carrier (3) mounted on the base. The base further includes a stationary portion (21), suitable for being mounted on a surface, and a movable portion (22) mounted to turn relative to the stationary portion (21) about a vertical axis of rotation (Z-Z). The system is characterized in that the information carrier (3) is mounted to turn relative to the base (2), about an axis of rotation (X-X) that slopes at an angle (α) lying in the range 20° and 90° relative to the vertical axis of rotation (Z-Z). The system is configured in such a manner that the turning movement of the information carrier (3) and the turning movement of the movable portion (22) are linked so that said movements conserve the orientation of said information carrier (3).

10 Claims, 8 Drawing Sheets

(56) References Cited

U.S. PATENT DOCUMENTS

| | | | | |
|---|---|---|---|---|
| 3,135,235 A | * | 6/1964 | Romano | E01F 9/688 116/63 R |
| 6,460,277 B1 | * | 10/2002 | Tower | A44C 3/001 40/1.5 |
| 2009/0076718 A9 | * | 3/2009 | Cody | E01F 9/541 701/532 |

FOREIGN PATENT DOCUMENTS

| | | |
|---|---|---|
| FR | 2 767 596 | 2/1999 |
| FR | 2 871 607 | 12/2005 |

* cited by examiner

PEDESTRIAN ORIENTATION STRUCTURE

GENERAL TECHNICAL FIELD

The present invention relates to the field of directional furniture for guiding pedestrians.

STATE OF THE ART

Directional furniture for guiding pedestrians is a necessary tool for people who would like to understand the space around them and/or find their destination.

Various types of furniture thus make it possible to guide the public at urban, natural, or tourist sites, and thus enhance the attractiveness of those places.

Numerous forms of guide elements are commonly proposed, going from simple maps arranged on horizontal or vertical surfaces, to panoramic information panels used more commonly in the natural environment, or indeed to interactive elements that are increasingly being developed.

Those guide elements need to satisfy many requirements, in particular in terms of bulkiness and of the quality of the information conveyed.

The quality requirement is particularly difficult to satisfy for technical and cognitive reasons. A local map is easily accessible to the general public only when: 1) it is always correctly oriented relative to the real world; and 2) it enables a final destination to be found, wherever it may be, in such a manner that the itinerary is not too complex for being mentally constructed and remembered. These are two major strengths of digital tools (which are not suitable for use by everyone, everywhere, and all of the time), and they are not provided by conventional tools.

There thus exists a need in the field of directional street furniture to define a device that meets these various criteria in satisfactory manner.

SUMMARY OF THE INVENTION

The present invention thus aims to provide a street furniture element addressing these various issues.

To this end, the present invention provides a directional guidance system comprising:

a base configured to be mounted on a surface; and
an information carrier mounted on the base;
the base comprising a stationary portion, suitable for being mounted on a surface, and a movable portion mounted to turn relative to the stationary portion about a vertical axis of rotation;
the system being characterized in that the information carrier is mounted to turn relative to the movable portion of the base, about an axis of rotation that slopes at an angle lying in the range 20° to 90° relative to the vertical axis of rotation;
the system being configured in such a manner that the turning movement of the information carrier and the turning movement of the movable portion are linked so that said movements conserve the orientation of said information carrier.

In one example, the information carrier comprises map information or guide information that is correctly oriented relative to the real world, said system being configured so that the map information present on the information carrier is turned synchronously with turning of the movable portion of the base.

The system may further comprise a casing mounted stationary relative to the movable portion of the base, said casing being configured in such a manner as to cover a portion of the information carrier.

The casing may be completely or partly opaque, or completely or partly transparent.

By way of example, said information carrier may be mounted to turn relative to the movable portion of the base, about an axis of rotation that is perpendicular to the vertical axis of rotation of the base.

The device may then include two information carriers, typically parallel to each other, each mounted to turn relative to the movable portion of the base about said axis of rotation, said two information carriers being arranged symmetrically relative to the vertical axis of rotation of the base, and being configured so that they turn in directions of rotation that are opposite to each other about the axis of rotation during turning of the movable portion of the base about the vertical axis of rotation.

In a variant, the information carrier is mounted to turn relative to the movable portion of the base, about an axis of rotation that slopes at an angle that is greater than or equal to 20° and that is less than 90° relative to the vertical axis of rotation of the base.

The information carrier is typically a disk.

The projection of the information carrier onto the vertical axis of rotation of the base thus typically defines a vertical diameter of the information carrier, said information carrier carrying map information provided in such a manner that the cardinal points corresponding to the vertical diameter of the information carrier correspond to the cardinal points defined by the projection of the axis of rotation of the information carrier onto a horizontal plane.

PRESENTATION OF THE FIGURES

Other characteristics, objects, and advantages of the invention appear from the description below, given by way of purely illustrative and non-limiting example, and to be read with reference to the accompanying figures, in which.

In each of the figures, common elements are given identical numerical references.

DETAILED DESCRIPTION

Figure 1:
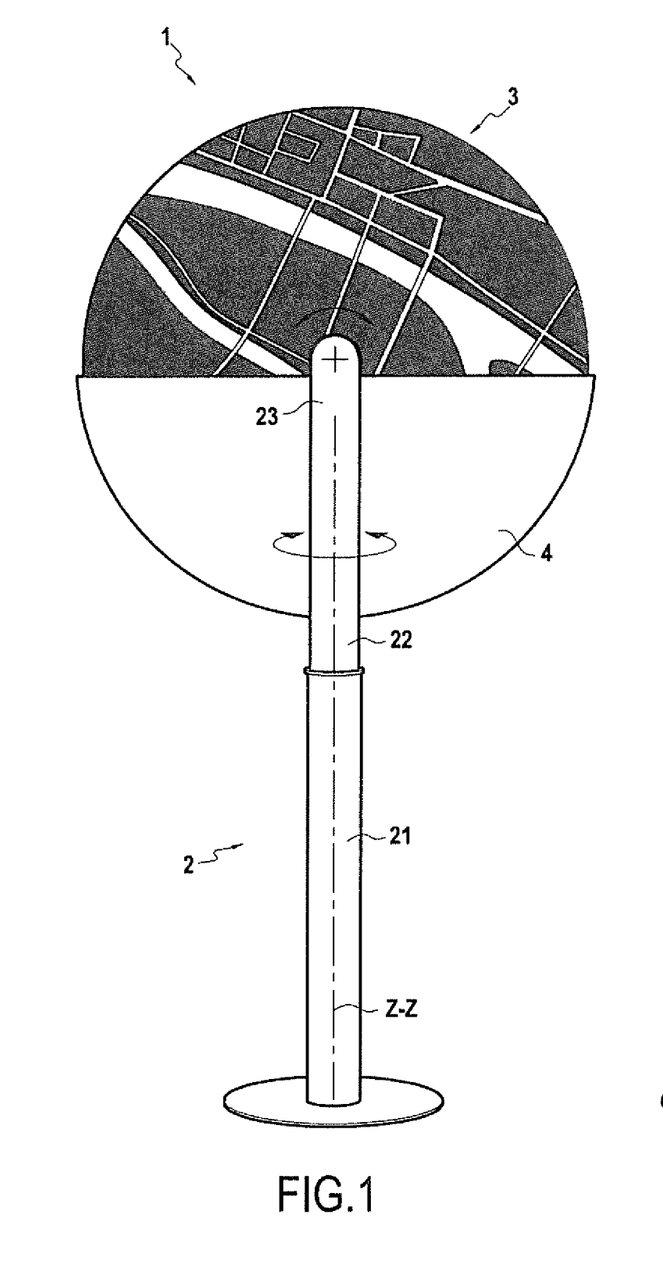
FIGS. 1 and 2 are two views of a device in an aspect of the invention.
Figure 2:
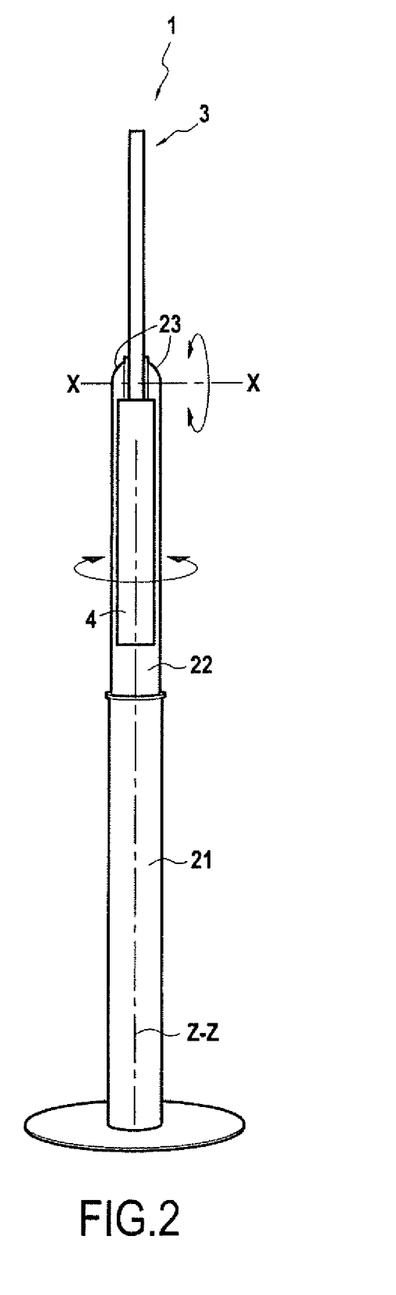

FIGS. 1 and 2 are two views of a device in an aspect of the invention.

These figures show a directional guidance system 1 comprising a base 2 for mounting on a horizontal surface (typically the ground), and an information carrier 3 that is mounted to turn relative to the base 2.

The base 2 extends in a longitudinal direction defining an axis Z-Z that is vertical relative to the horizontal surface.

The base 2 comprises a stationary portion 21, suitable for being anchored in the ground, and a movable portion 22, mounted to turn relative to the stationary portion 21 about an axis of rotation that corresponds to the vertical axis Z-Z, i.e. the longitudinal direction of the base 2.

An information carrier 3 is linked to the movable portion 22 of the base 2.

In the embodiment shown, the information carrier 3 is a disk.

In the embodiment shown, a casing 4 is also mounted on the movable portion 22, in such a manner as to cover a portion of the information carrier 3, in this embodiment a portion corresponding substantially to the bottom half of the information carrier 3.

As can be seen below, such a casing 4 makes it possible to limit the amount of information that is visible at any one time to a user, and contributes to improving the readability of the information presented on the information carrier 3.

The casing 4 is typically mounted to be stationary relative to the movable portion 22. The casing 4 may be made from a material that is completely or partly opaque, or from a material that is completely or partly transparent.

The casing 4 may also present portions that are completely or partly opaque, and portions that are completely or partly transparent.

The information carrier 3 is pivotally mounted relative to the movable portion 22 of the base 2, to pivot about an axis of rotation that is not parallel to the vertical axis Z-Z about which the movable portion 22 of the base 2 is mounted to turn.

In the embodiment shown in FIGS. 1 and 2, the information carrier 3 is pivotally mounted relative to the movable portion 22 of the base 2, about an axis that is perpendicular to the vertical axis Z-Z.

In this embodiment, the movable portion 22 of the base 2 comprises two arms 23 forming a fork, with ends mounting a pin that passes through the center of the information carrier 3, thus linking it rotatably to the movable portion 22 of the base 2. In this embodiment, the axis is oriented about a horizontal axis X-X, perpendicular to the vertical axis Z-Z.

Two turning movements are therefore possible; turning movement of the movable portion 22 of the base 2 about the vertical axis Z-Z relative to the stationary portion 21 of the base 2, and turning movement of the information carrier 3 about the horizontal axis X-X relative to the movable portion 22 of the base 2.

These two turning movements are linked, such that turning about one of these axes of rotation necessarily leads to turning about another one of these axes of rotation.

More precisely, the turning movements about these two axes are linked in such a manner as to conserve the orientation of the information carrier 3.

The information carrier 3 comprises map information or guide information, associated with the environment of the directional guidance system, typically a map, a plan, or map markers.

A vertical diameter of the information carrier 3 is defined as being the diameter of the information carrier 3 about the vertical axis Z-Z.

As a function of the orientation of the information carrier 3, the vertical diameter defines a straight line extending between two given cardinal points.

By way of example, it is considered that the vertical diameter corresponds to the line N-S, i.e. the line passing through the cardinal directions north and south shown on the information carrier 3.

The turning movements are thus linked, in such a manner that at any moment, the orientation corresponding to the vertical diameter of the information carrier, also corresponds to the orientation of the horizontal axis X-X.

By way of example, consideration is given to an initial configuration in which the axis X-X is oriented in a north-south direction, and the vertical diameter of the information carrier 3 also corresponds to the north-south direction of the information shown on the information carrier 3.

When the user applies a turning movement to the information carrier 3, e.g. of 90° about the axis X-X, the vertical diameter of the information carrier 3 thus corresponds to the east-west direction of the information shown on the information carrier 3.

The turning movements of the information carrier 3 and of the movable portion 22 are thus linked so that this turning movement of the information carrier 3 drives a turning movement of the movable portion 22 about the axis Z-Z, such that the axis X-X is also oriented in the east-west direction.

If it is considered that the map information shown on the information carrier is distributed over 360° in regular manner, then the turning movements of the information carrier 3 and of the movable portions 22 are typically configured in such a manner that a turning movement of the information carrier 3 through a given angle about the axis X-X leads to a turning movement of the movable portion 22 through the same angle about the axis Z-Z, and vice versa.

Thus, when a user handles the directional guidance system 1, the system naturally points the user in a direction corresponding to the information presented on the information carrier 3, thereby facilitating orientation of the user.

Figure 3:
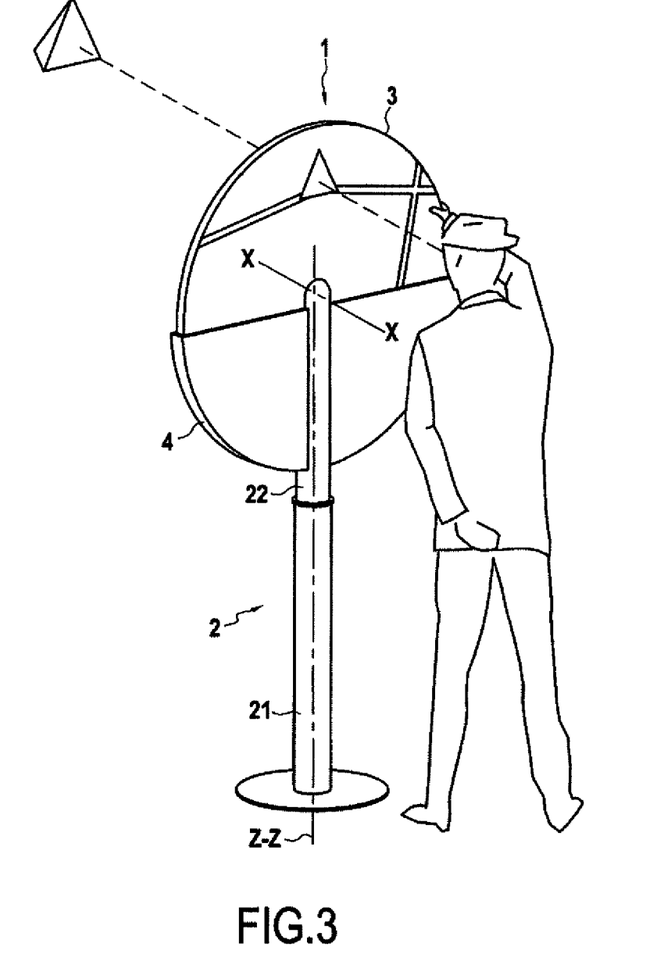
FIGS. 3 to 5 show diagrammatically the operation of such a device.
Figure 4:
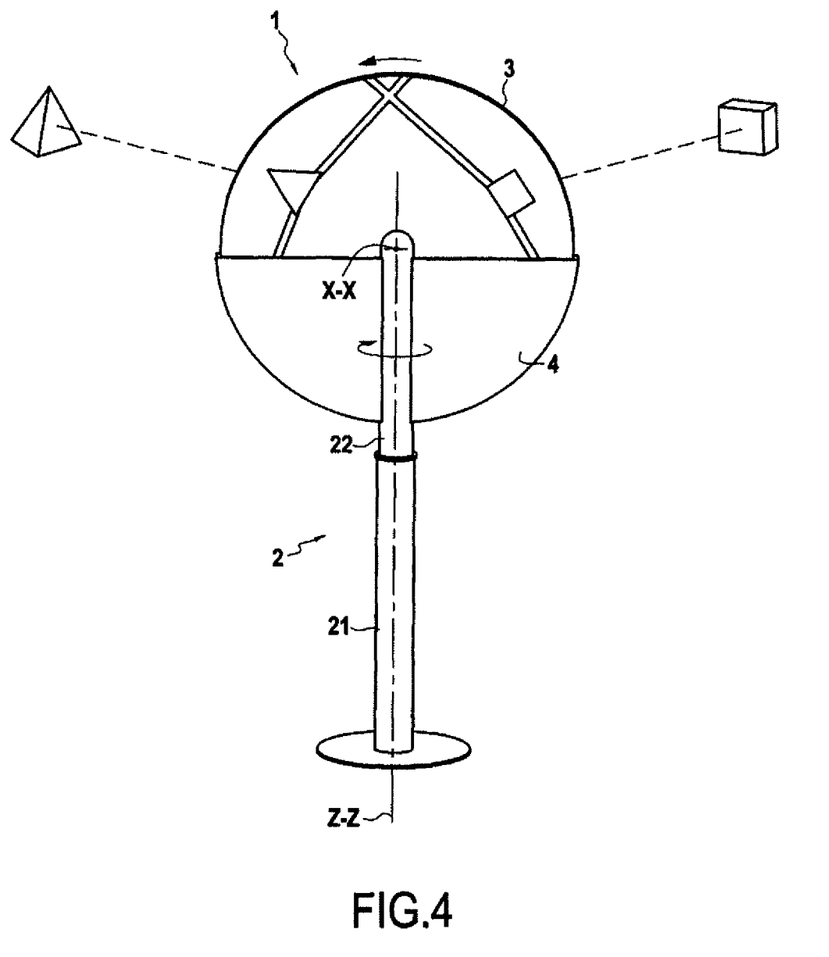
Figure 5:
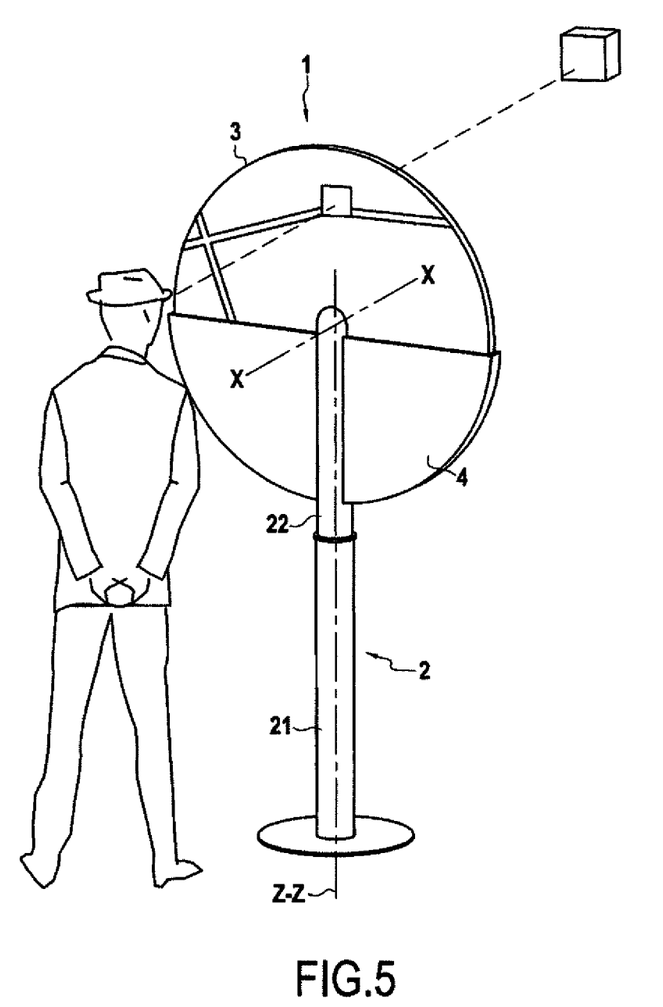

FIGS. 3, 4, and 5 thus show diagrammatically the use of such a directional guidance system 1 as described above in FIGS. 1 and 2.

Two geographical elements are thus represented diagrammatically, in this embodiment being represented by a cube and by a pyramid.

In the situation shown in FIG. 3, the user has oriented the information carrier 3 in such a manner as to find the pyramid. The center of the information carrier 3 typically represents the current position of the user.

The user has therefore positioned the representation of the pyramid towards the top of the information carrier 3, facing the user. The expression "towards the top of" means that the representation of the pyramid is located along the vertical diameter of the information carrier 3.

As explained above, by positioning the representation of the pyramid in this way towards the top of the information carrier 3 drives the movable portion 22 to turn in such a manner that the axis of rotation X-X of the information carrier is oriented in a direction corresponding to the direction represented by the vertical diameter of the information carrier 3.

As a result, by positioning the representation of the pyramid towards the top of the information carrier 3, the axis of rotation X-X of the information carrier 3 is oriented in a direction pointing towards the pyramid.

Thus, the user positioned facing the information carrier 3 will naturally be positioned facing the selected geographical element, which the user has placed towards the top of the information carrier.

When the user seeks to be oriented relative to another geographical element (for example, the cube), the user turns the information carrier 3 about its axis of rotation X-X in such a manner as to position the cube on the vertical diameter of the information carrier 3. As explained above, this turning movement of the information carrier 3 about its axis of rotation X-X drives the movable portion 22 of the base 2 to turn about its vertical axis Z-Z.

FIG. 4 is a diagram showing these turning movements, marked by two arrows about the axes X-X and Z-Z.

FIG. 5 shows the result of these turning movements; the user has turned the information carrier 3 so that the representation of the cube is on the vertical diameter of the information carrier 3; as a result, the axis X-X is oriented in the direction of the geographical element corresponding thereto.

As a result of the turning of the movable portion 22 of the base 2, the user is encouraged to move so as to stay facing the information carrier 3; the user is thus naturally positioned facing the selected geographical element.

Figure 6:
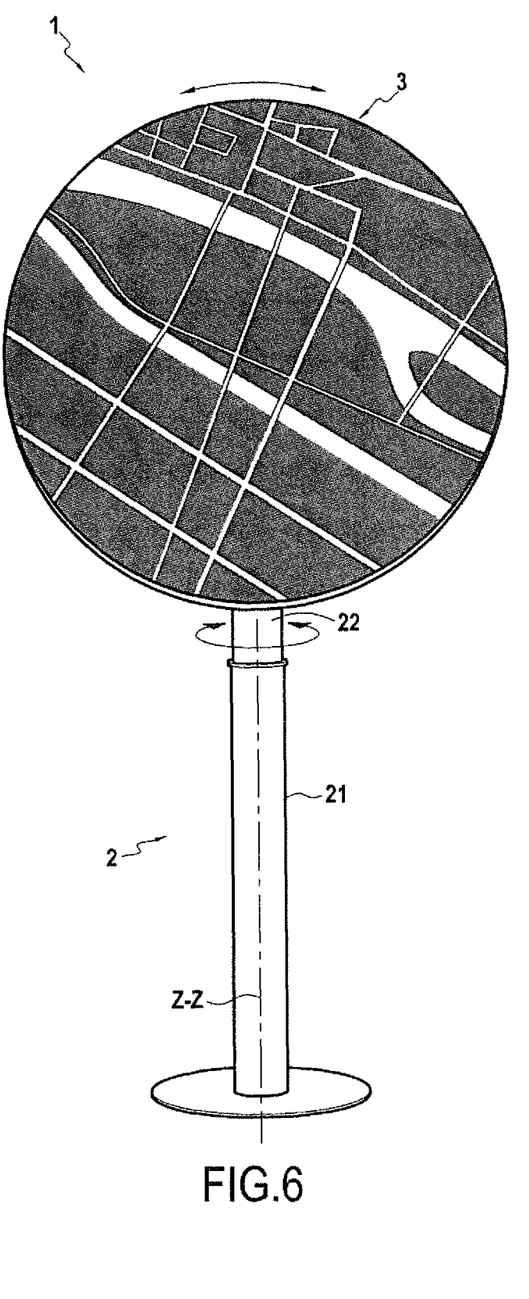
FIGS. 6 and 7 are two views of another embodiment of a device in an aspect of the invention.
Figure 7:
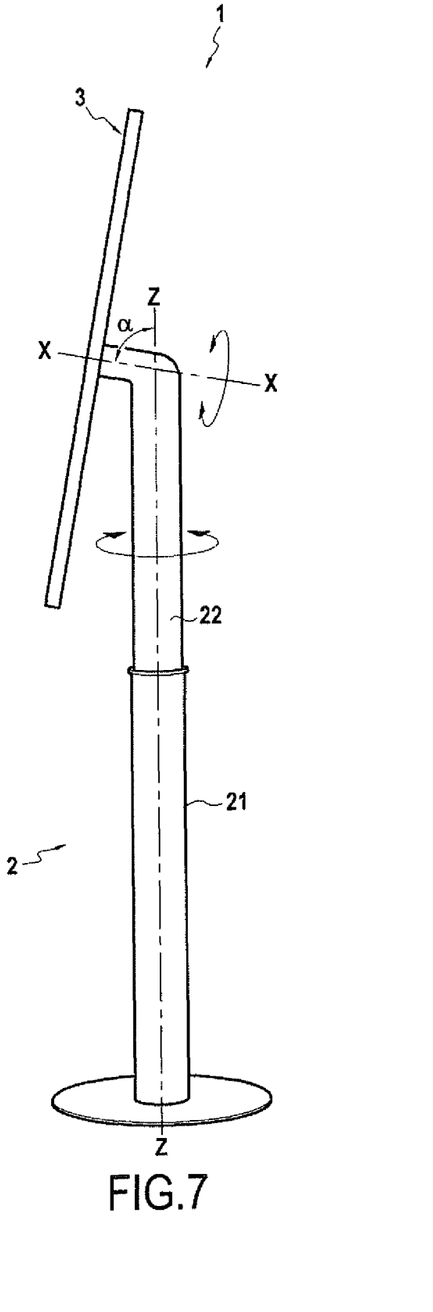

FIGS. 6 and 7 show another example of a directional guidance system 1 in an aspect of the invention.

As with the above-described embodiment, a portion of the information carrier 3 may be hidden by means of a casing 4.

In this embodiment, the information carrier 3 is likewise mounted to turn relative to the movable portion 22 of the base 2, but instead about an axis of rotation that is non-horizontal.

The information carrier 3 is therefore mounted to turn relative to the movable portion 22 of the base 2 about an axis of rotation X-X that slopes at an angle α relative to the vertical direction Z-Z.

The angle α typically lies in the range 20° to 90°, 90° corresponding to the horizontal configuration as described above with reference to FIGS. 1 and 2.

By way of example, the linkage in rotation between the movable portion 22 of the base 2 and the information carrier 3 is implemented by means of a pivot connection linked to a rear face of the information carrier 3, the rear face being the face facing towards the ground, as opposed to the front face of the information carrier 3 that faces towards the user and that is to receive map information.

When the axis of rotation of the information carrier 3 is horizontal relative to the movable portion 22 of the base 2, both faces of the information carrier 3 are easily accessible to a user. They may therefore both include information, which may be identical or different. When both faces of the information carrier 3 carry map information or guide information, they are made in such a manner that orientation is conserved during turning movements of the movable portion 22 and of the information carrier 3 (or of the information carriers when said carrier is duplicated, as explained below).

Operation of the system as presented in FIGS. 6 and 7 is similar to the operation as described above with reference to FIGS. 1 to 5.

However, because of the slope of the axis of rotation X-X, in this embodiment the vertical diameter of the information carrier corresponds to the projection of the vertical axis Z-Z onto the information carrier 3.

As described above, the turning movement of the information carrier 3 drives turning of the movable portion 22 of the base 2 (and vice versa), in such a manner that the axis of rotation X-X is oriented in a direction corresponding to the direction represented on the vertical diameter of the information carrier 3.

Insofar as the axis of rotation X-X is sloping in this embodiment, it should be considered that its orientation is defined by its projection onto a horizontal surface.

Thus, as previously described with reference to FIGS. 3 to 5, when using the directional guidance system 1, the user is naturally encouraged to take up a position facing the geographical element the user has placed towards the top of the information carrier 3, or more generally on the vertical diameter of the information carrier 3.

By way of example, the means for rotating the information carrier 3 and the moving portion 22 can be configured so that a turning movement of one of these elements through a given angle about its axis of rotation drives turning of the other one of the elements through the same angle about its axis of rotation.

The relationship between these turning movements is modulated as a function of the nature and scale of the information shown on the information carrier 3.

Whatever the structure of the system 1, several technical solutions may be used to implement the pivot connections and how they are linked.

By way of example, the linkage between the two connections may be performed by means of belts or chains, by means of a flexible transmission, a spring transmission, a universal joint, a bellows, a worm drive, or indeed bevel gears.

Transmission by bevel gears is particularly advantageous because of its small size and its great reliability.

Figure 8:
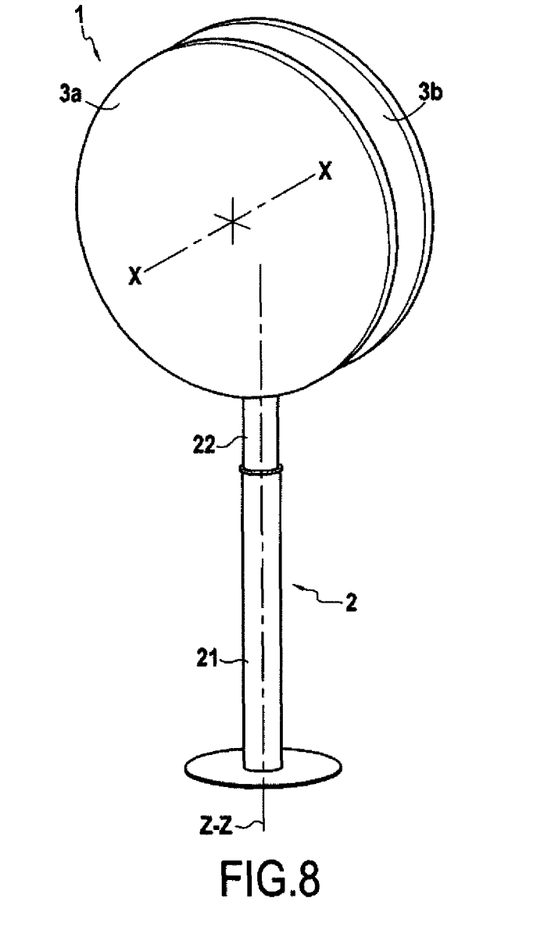
FIGS. 8 to 11 show another embodiment of a device in an aspect of the invention.
Figure 9:
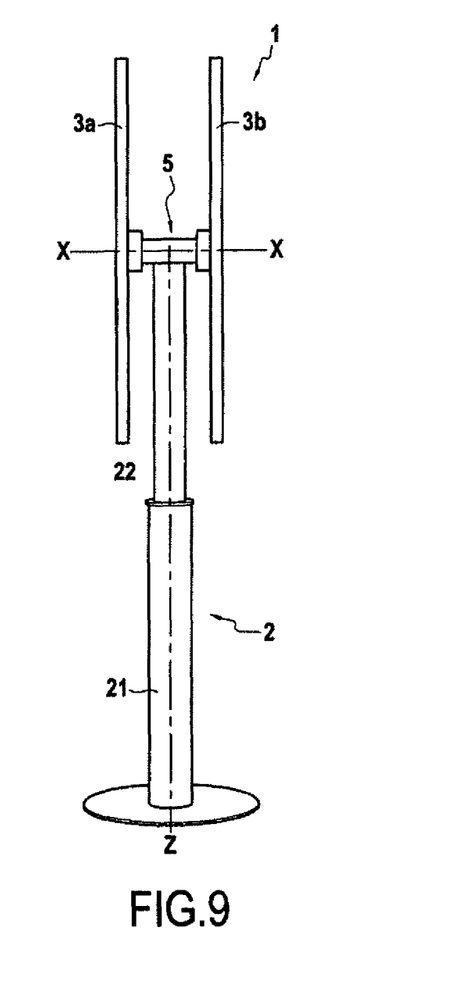

In a variant, when the axis of rotation X-X of the information carrier 3 relative to the movable portion 22 of the base 2 is horizontal, the information carrier 3 can be duplicated. The directional guidance system 3 thus comprises two information carriers 3a and 3b each typically comprising directional information (map information or guide information), associated with the environment of the device. Such an embodiment is shown in FIGS. 8 and 9.

As can be seen in these figures, both information carriers 3a are 3b arranged symmetrically relative to the vertical axis of rotation Z-Z, or typically relative to a plane including the vertical axis of rotation Z-Z and perpendicular to the axis of rotation X-X, in such a manner as to each present a face that is visible to a user on each side of the device.

Both information carriers 3a and 3b are connected to the base via a drive system 5, ensuring turning movement of both of the information carriers 3a and 3b in conjunction with the turning of the movable portion 22 of the base 2 as described above.

When the directional guidance device 1 includes both information carriers 3a and 3b, it should however be understood that these two information carriers 3a and 3b should turn in opposite directions so as to conserve the orientation of both information carriers 3a and 3b relative to the surrounding area.

As described above, when considering a single information carrier with information shown on only one face, the information carrier 3, a turning movement of the movable portion 22 of the base 2 through an angle β about the axis Z-Z drives a turning movement of the information carrier 3 through the same angle β about the axis X-X in such a manner as to conserve orientation.

For a directional guidance device 1 as shown in FIGS. 8 and 9, both information carriers 3a and 3b turn in opposite directions. Thus, by considering a turning movement of the movable portion 22 of the base 2 through an angle 3 about the axis Z-Z, one of the information carriers 3a and 3b turns through an angle β about the axis X-X, whereas the other one of the information carriers 3a and 3b turns through an angle −β about the axis X-X. The drive system 5 thus typically includes means such as spur gears or bevel gears ensuring that the two information carriers 3a and 3b turn in opposite directions.

Figure 10:
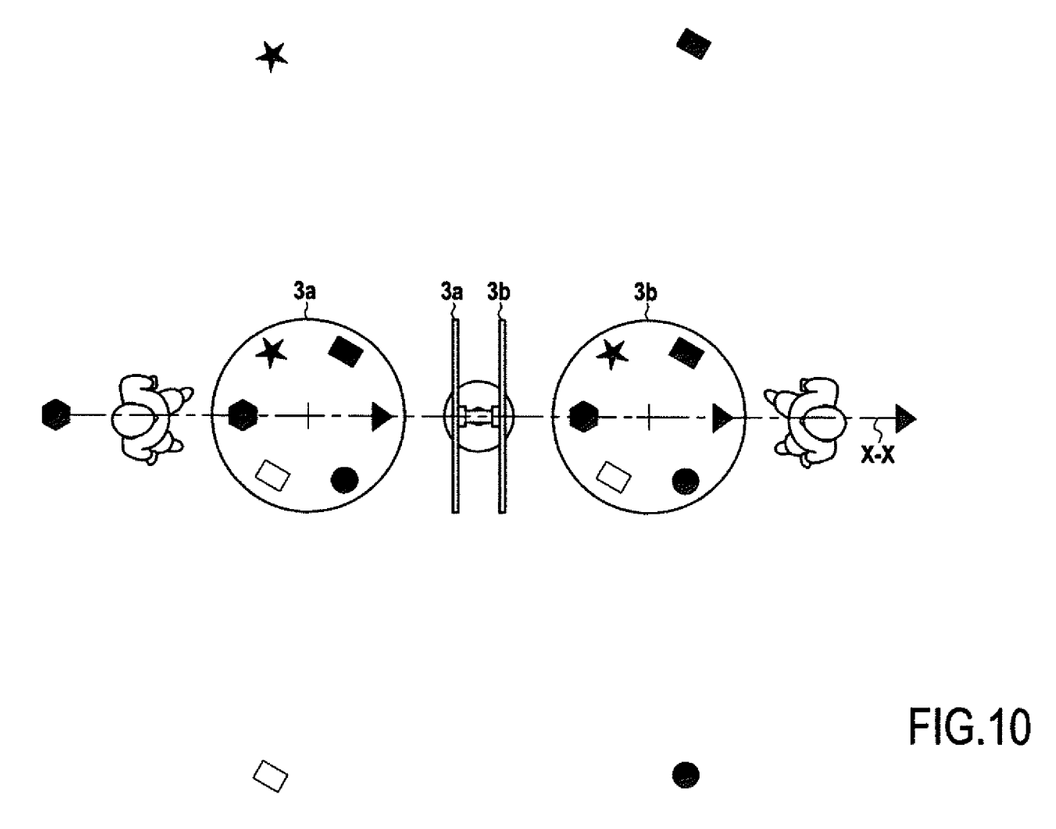
Figure 11:
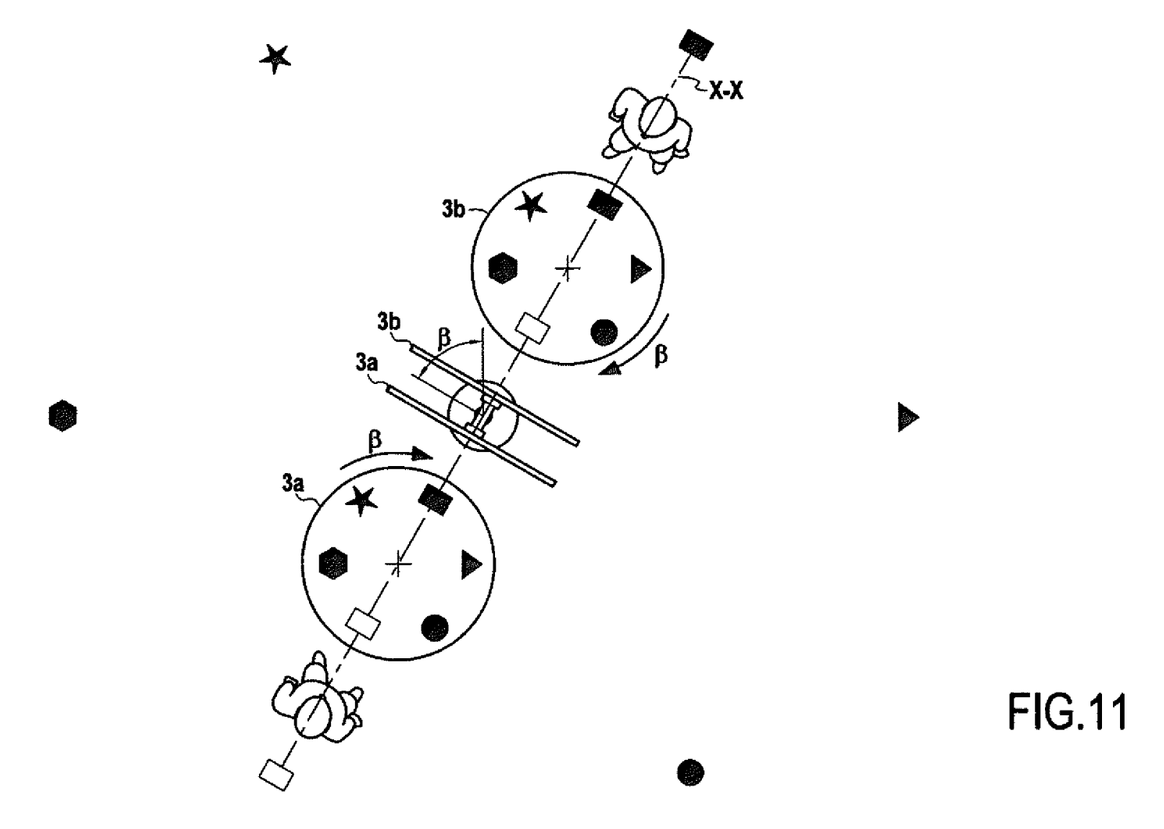

FIGS. 10 to 11 show such operation.

These figures show diagrammatically a directional guidance device 1 that is provided with two information carriers 3a and 3b as described above.

These figures give a front view of each of the information carriers 3a and 3b, showing diagrammatically what a user sees when positioned facing the information carrier 3a and 3b in question.

As can be seen in FIG. 11, when the user rotates the movable portion 22 of the base 2 through an angle β about the axis Z-Z, each of the information carriers 3a and 3b rotates so as to conserve its orientation relative to the real world, but does so in different directions about the axis X-X.7

For two users each situated on opposite sides of the device, the apparent turning movement is in the same direction.

It should be understood that such an embodiment including two information carriers may also be provided with a casing 4 as described above.

The invention claimed is:

1. A directional guidance system (1) comprising:
a base (2) configured to be mounted on a surface; and
an information carrier (3) mounted on the base;
the base comprising a stationary portion (21), suitable for being mounted on a surface, and a movable portion (22) mounted to turn relative to the stationary portion (21) about a vertical axis of rotation (Z-Z);
the system being characterized in that the information carrier (3) is mounted to turn relative to the movable portion (22) of the base (2), about an axis of rotation (X-X) that slopes at an angle (α) lying in the range 20° to 90° relative to the vertical axis of rotation (Z-Z);
the system (1) being configured in such a manner that a turning movement of the information carrier (3) is turned synchronously with a turning movement of the movable portion (22) so that said movements conserve an orientation of said information carrier (3).

2. A system (1) according to claim 1, wherein the information carrier (1) comprises a set of map information or guide information, said system being configured so that the map information or the guide information present on the information carrier (3) is turned synchronously with turning of the movable portion (22) of the base (2).

3. A system (1) according to claim 1, further comprising a casing (4) mounted stationary relative to the movable portion (22) of the base (2), said casing (4) being configured in such a manner as to cover a portion of the information carrier (3).

4. A system (1) according to claim 3, wherein the casing (4) is completely or partly opaque, or completely or partly transparent.

5. A system (1) according to claim 4, wherein the casing (4) comprises a portion that is completely or partly opaque, or completely or partly transparent.

6. A system (1) according to claim 1, wherein the information carrier (3) is mounted to turn relative to the movable portion (22) of the base (2), about an axis of rotation (X-X) that slopes at an angle (α) that is greater than or equal to 20° and that is not greater than 90° relative to the vertical axis of rotation (Z-Z) of the base (2).

7. A system (1) according to claim 6, wherein said angle (α) is equal to 90°.

8. A system (1) according to claim 7, including two information carriers (3a, 3b) each mounted to turn relative to the movable portion (22) of the base (2) about said axis of rotation (X-X), said two information carriers (3a, 3b) being arranged symmetrically about the vertical axis of rotation (Z-Z) of the base (2) and being configured so that they turn in directions of rotation that are opposite to each other about the axis of rotation (X-X) during turning of the movable portion (22) of the base about the vertical axis of rotation (Z-Z).

9. A system (1) according to claim 1, wherein said information carrier (3) is a disk.

10. A system (1) according to claim 9, wherein a projection of the information carrier (3) onto the vertical axis of rotation (Z-Z) of the base (2) defines a vertical diameter of the information carrier (3), said information carrier (3) carrying map information provided in such a manner that cardinal points corresponding to the vertical diameter of the information carrier (3) correspond to cardinal points defined by a projection of the axis of rotation (X-X) of the information carrier (3) onto a horizontal plane.

* * * * *